United States Patent [19]

Corbin et al.

[11] Patent Number: 5,306,565
[45] Date of Patent: Apr. 26, 1994

[54] HIGH TEMPERATURE CERAMIC COMPOSITE

[75] Inventors: Normand D. Corbin, Northborough; Brad J. Miller, Worcester; Kazimierz Sawicki, Worcester, all of Mass.; John W. Lucek, Canton; James G. Hannoosh, Avon, both of Conn.

[73] Assignee: Norton Company, Worcester, Mass.

[21] Appl. No.: 584,223

[22] Filed: Sep. 18, 1990

[51] Int. Cl.⁵ .................. B32B 15/04; B32B 17/06
[52] U.S. Cl. .................. 428/432; 384/907.1; 384/911; 428/368; 428/375; 428/379; 428/433; 428/446; 428/409; 428/698; 428/913; 428/472
[58] Field of Search .......... 428/408, 698, 472, 368, 428/384, 379, 428, 426, 432, 433, 434, 446, 375; 228/122; 384/907.1, 911

[56] References Cited

U.S. PATENT DOCUMENTS

| | | | |
|---|---|---|---|
| 3,711,171 | 1/1973 | Orkin et al. | 308/241 |
| 3,895,156 | 7/1975 | Hammond | 428/698 |
| 4,341,965 | 7/1982 | Okuo et al. | 428/698 |
| 4,435,455 | 3/1984 | Prewo et al. | 428/698 |
| 4,476,178 | 10/1984 | Veltri et al. | 428/408 |
| 4,511,612 | 4/1985 | Hüther et al. | 428/697 |
| 4,554,197 | 11/1985 | Chyung et al. | 428/426 |
| 4,591,535 | 5/1986 | Mizuhara | 428/627 |
| 4,594,106 | 6/1986 | Tanaka et al. | 106/1.12 |
| 4,630,767 | 12/1986 | Mizuhara | 228/122 |
| 4,642,271 | 2/1987 | Rice | 428/698 |
| 4,673,658 | 6/1987 | Gadkaree et al. | 501/89 |
| 4,698,271 | 10/1987 | Moorhead | 228/122 |
| 4,766,013 | 8/1988 | Warren | 428/408 |
| 4,869,943 | 9/1989 | Corbin et al. | 428/698 |
| 4,885,199 | 1/1989 | Corbin et al. | 428/212 |

FOREIGN PATENT DOCUMENTS 0252046 1/1988 European Pat. Off. .
0290322 11/1988 European Pat. Off. .

Primary Examiner—Ellis P. Robinson
Assistant Examiner—Archene A. Turner
Attorney, Agent, or Firm—Volker Ulbrich

[57] ABSTRACT

A composite ceramic structure which does not fail catastrophically and thus is useful as a ceramic rolling contact bearing assembly is disclosed. The structure is a ceramic monolith bonded through an interlayer to a fiber-reinforced ceramic body. The structure is useful at elevated temperatures.

25 Claims, 2 Drawing Sheets

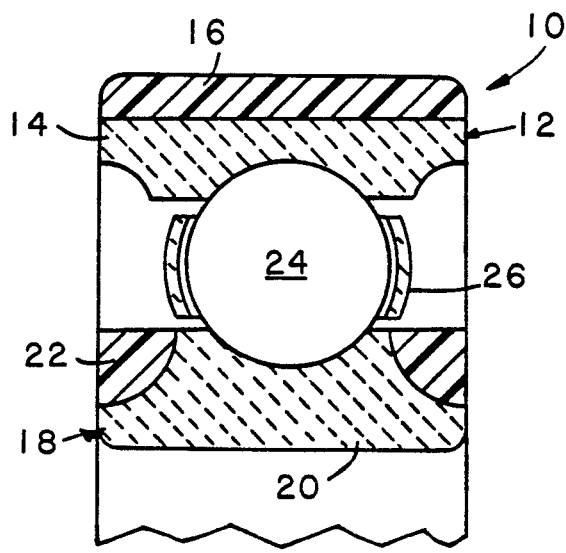
FIG. 1
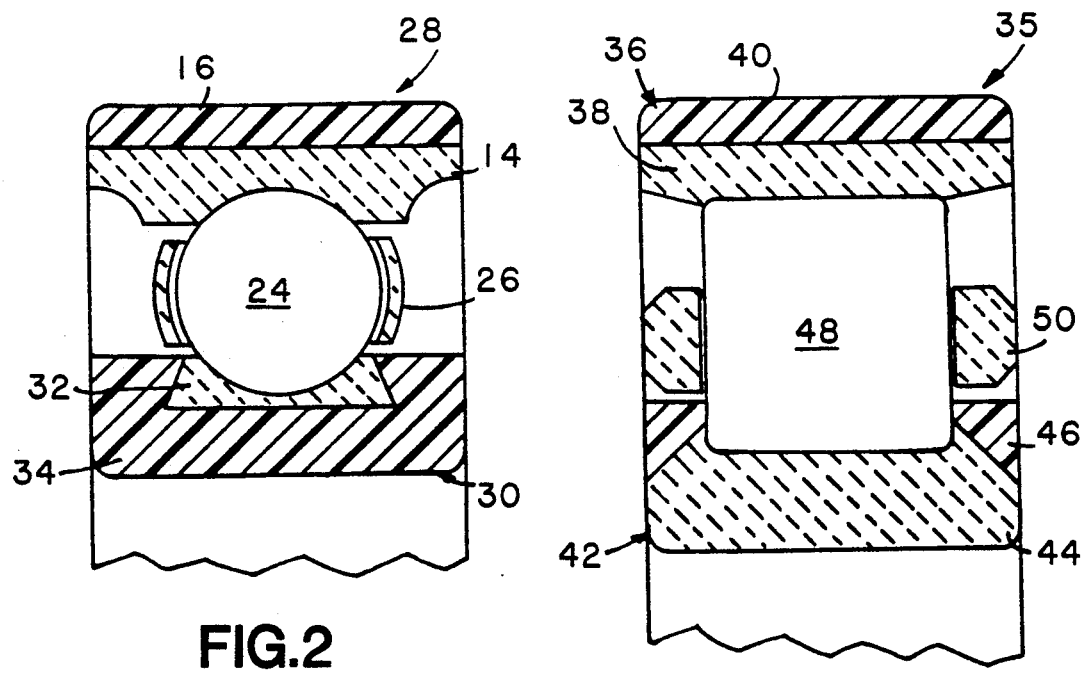
FIG. 2
FIG. 3

HIGH TEMPERATURE CERAMIC COMPOSITE

TECHNICAL FIELD

The present invention is directed to composite ceramic structures which (i) have surface properties of ceramic monoliths, (ii) are not subject to the catastrophic failure as are ceramic monoliths, and (iii) can withstand extended exposure to temperatures up to 500° C. or higher. The composite structures are produced by a chemical attachment of a ceramic monolith to a fiber-reinforced ceramic. The attachment causes any cracks generated in the monolith to be arrested by the fiber-reinforced ceramic.

BACKGROUND OF THE INVENTION

A major impediment to the use of ceramic monoliths in certain applications is that when they fail, they do so catastrophicly without any warning of the impending failure. Previous attempts at overcoming the problem of catastrophic failure have entailed reinforcing the ceramic monolith with other materials, i.e. refractory fibers. While the addition of the refractory fibers generally does toughen a ceramic monolith, prevent the catastrophic failure, and allow the ceramic to be used at conventional elevated temperatures, it also destroys some of the desirable properties of the ceramic monolith such as wear resistance and fatigue resistance. Moreover, the incorporation of the fibers creates an entirely new material having substantially different surface and other properties from the base ceramic from which it was prepared. Thus, while the fiber-reinforced materials possess increased toughness and non-catastrophic failure characteristics, they are unsuitable for applications requiring the surface integrity and properties of a monolithic ceramic. And, as new materials, they must undergo extensive evaluation before even being considered for commercial use.

Ceramic monoliths having the same chemical composition have been joined to each other in the past, particularly to produce complex shapes which could not be molded as a single body. The joined bodies, however, have suffered from the same catastrophic failure problems as single monoliths.

Also ceramic monoliths have been joined to metals, particularly for the purpose of putting a wear surface on the metal. Although beneficial for wear performance, these materials still generally exhibit catastrophic failure behavior. Moreover, the vast difference in the coefficients of thermal expansion between metals and ceramics results in high stresses in the structures which (i) can lead to fracture during thermal excursions in use and manufacture and (ii) precludes the use of such structures at temperatures greater than about 400° C. for copper-silver braze connections.

Ceramic light weight armor for helicopter seats and the like has been produced by joining silicon carbide or boron carbide bodies to a polymeric composite of epoxy with Kevlar fibers. The function of the polymeric composite is to stop the shrapnel and hold the ceramic pieces together after fracture from a projectile. The resultant structure is only useful at relatively low temperature due to the presence of the polymeric composite.

Thus if a composition could be developed having (i) the surface and other characteristics of a ceramic monolith, (ii) the non-catastrophic failure characteristics of ductile engineering materials and (iii) the capacity not to deteriorate when exposed to elevated temperatures for extended periods of time, it would find utility in many future applications. Particularly, such a material is needed to produce rolling contact bearings for use in future aircraft engine components. Also it should find use in automobile engine components, aerospace control surfaces, leading edges in aircraft or missile application, turbine engine components, high temperature enclosures, space application including the National Aerospace plane (NASP) engine, as well as in various structural applications.

It is an object of the present invention to produce such a composition which heretofore has not existed.

SUMMARY OF THE INVENTION

The composite ceramic structures according to the present invention are characterized in that they have at least one surface with the properties of a ceramic monolith, are not subject to the usual catastrophic failure of ceramic monoliths, and do not fail when exposed to elevated temperatures for an extended period of time. The structures comprise a dense ceramic monolith bonded to a fiber-reinforced ceramic body by means of a high temperature resistant interlayer.

BRIEF DESCRIPTION OF THE DRAWING

FIG. 1 is a sectional view of one embodiment of a ceramic bearing race of the present invention.

FIG. 2 is a sectional view of an alternative embodiment of the present invention.

FIG. 3 is a sectional view of a further alternative embodiment of the present invention.

DETAILED DESCRIPTION OF THE INVENTION

Figure 4:
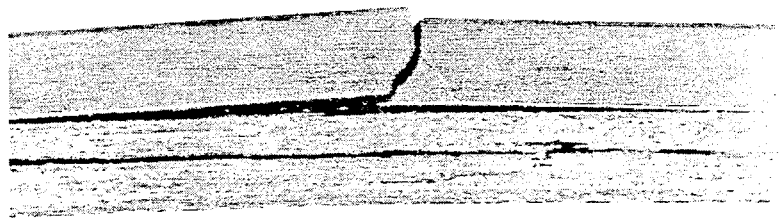
FIG. 4 is a picture of a composite structure of the invention as produced in Example I after cracking under stress.

The ceramic monoliths useful in the present invention are dense bodies of ceramic materials such as silicon nitride and silicon carbide. For bearing applications the currently preferred monolith is silicon nitride due to its excellent rolling contact fatigue behavior (30,000,000 cycles at $1 \times 10^6$ psi contact stress) which makes it particularly advantageous when the composite structure is used as a bearing ring. The silicon nitride monoliths, for example, are generally prepared by sintering silicon nitride powder in combination with one or more sintering aids. Any sintering aid may be used so long as it can make the silicon nitride dense, strong, and hard. However, it is preferable to use MgO, $Al_2O_3$, $Y_2O_3$, or other rare earth oxides, and/or a compound of Mg, Al, Y or other rare earths which is converted to the appropriate oxide by heating. When an Mg compound is used, it should be present in an amount of about 0.5 to 15% by weight when calculated as MgO. When an Al compound is used, it should be present in an amount of about 2 to 15% by weight when calculated as $Al_2O_3$. When a Y or other rare earth compound is used, it should be present in an amount of about 1 to 15% by weight when calculated as the oxide.

Bonded to the monoliths to provide catastrophic failure resistance to the monoliths are fiber-reinforced ceramic bodies. To prepare the desired joined product, the ceramic matrix composite must exhibit non-catastrophic failure. This is generally exhibited by materials that have fracture toughnesses greater than about 20

MPam$^{\frac{1}{2}}$. The bodies may be prepared from a variety of ceramic fibers including alumina, carbon, silica, silicon carbide, and the like. The specific fiber used will depend upon the matrix, but more preferably it will be silicon carbide. The fiber may be either continuous or discontinuous, but preferably is continuous. When discontinuous fibers are used they must have sufficient length to result in fiber-reinforced ceramic bodies which do not fail catastrophically. Generally, a fiber length of 10 mm or more may be used, preferably at least 30 mm, with longer fibers preferred. The ceramic matrix which is reinforced by the fiber may be silicon nitride, silicon carbide, alumina, a silicate glass, a silicate-based glass ceramic, and the like. Preferably the ceramic matrix will be silicon carbide, silicon nitride, or a silicate-based glass ceramic. Most preferably the ceramic matrix will be a silicate-based glass ceramic. For the fiber-reinforced ceramic body to not fail catastrophically, there must be a "debonding" layer between the fiber reinforcement and the matrix. Suitable debonding layers include such as carbon, boron nitride, as well as the presence of regions of high porosity, as described in U.S. Pat. No. 4,885,199. Preferably the debonding layer is carbon. The debonding layer material may be coated onto the fiber before incorporation into the matrix or may be formed in situ by reaction between the fiber and the matrix during preparation of the ceramic body. The currently most preferred fiber-reinforced ceramic body is a calcium aluminosilicate glass ceramic with continuous silicon carbide yarn imbedded therein and having a carbon debonding layer formed in situ. Such material is available from Corning Glass Works as "CAS/Nicalon Experimental 1."

The ceramic monolith must be bonded to the fiber-reinforced ceramic body so that the composite structure can not fail catastrophically, i.e. even after a crack develops in the monolith the bonding must be sufficiently strong to prevent the monolith from breaking away from the fiber-reinforced ceramic body. Any suitable bond, i.e. one not only holding the solid monolith to the ceramic body but also holding a cracked monolith thereto, such as diffusion bonding with an active or reactive metal interlayer, reactive metal brazes, active metal brazes, or glass/ceramic diffusion bonding may be used. Preferably, however, an active metal braze is used since it permits bond formation generally with the lowest amount of exposure of the materials being joined to elevated temperatures which could detrimentally affect one or more of the components, e.g. extensive exposure of the composite to temperatures above about 600° C. in an oxidative atmosphere can cause oxidation of the debonding layer and thus eliminate the non-catastrophic failure characteristics of the composite structure. Bonding methods which use deformable metal interlayers may be used when the difference in thermal expansion coefficients between the monolith and the fiber-reinforced composite are large.

In the bonding process the monolith and the fiber-reinforced ceramic body are joined, generally through an intermediate cohesive interlayer, generally at temperatures of about 500° C. or higher, with the specific temperature and heating cycle being dependent upon the specific materials being joined as well as the joining method and materials. The interlayer serves to bond the monolith to the fiber-reinforced ceramic body and hold both a solid and a cracked monolith to the fiber-reinforced ceramic body. Examples of suitable interlayer materials include very thin, i.e. about 0.001 to about 0.005 inch, preferably about 0.002 to 0.004 inch, copper, nickel, aluminum, and similar metals; active metal braze compositions such as those based upon copper, silver, gold, palladium, titanium, and the like; and sputter coatings of active metals such as titanium, nickel, and the like. These interlayer materials are all well known in the art of joining and further details thereon may be found in the literature. The interlayer is placed between the surfaces to be joined and the composite structure is heated for a controlled period until the joining has been completed. While the principles of joining the ceramic materials used herein are well known, it is also known that a specific joining system must be developed for each pair of ceramics to be joined. Variations in the joining material as well as the time and temperatures used to perform the join can be determined by routine experimentation. A particularly suitable, relatively low temperature, active metal braze composition for joining a silicon nitride monolith to a calcium aluminosilicate glass is one containing about 59% silver, 27% copper, 13% indium, and 1% titanium. When this braze was used to join a silicon carbide monolith to the same glass with the same brazing cycle of Example I, the join was not successful. Changing the heating cycle or the braze composition will produce a successful join.

When an active metal braze is used, a braze in foil form is generally used. Foil brazes have very limited ductility and cannot be molded easily but they do ensure coverage of the entire surface being joined. Alternatively, paste brazes may be used when the joint does not lend itself to a flat interface, e.g. rough or multiple curvatures. Preferably, the brazing will be performed under high vacuum conditions, i.e. an initial vacuum of at least about $10^{-5}$ Torr. To ensure good brazing results, both components being joined need to reach the brazing temperature at the same time during the heat up. If one material were to heat faster during furnace heating (e.g. due to higher thermal conductivity) a non-uniform heat distribution could occur at the braze joint resulting in poor braze character.

As in most joining procedures, it is essential that the surfaces being joined be smooth, dry and clean of all dirt and oily residues. Generally, the surfaces will be polished to sufficient smoothness, e.g. a 5.0 microinch RMS finish or better.

One product which may be prepared using the composite technology of this invention is a rolling contact bearing assembly. One type of bearing assembly which may be formed according to this invention is shown in FIG. 1. The bearing assembly 10 comprises a ceramic outer ring 12 formed from a ceramic monolith member 14 attached to a fiber-reinforced member 16 and a ceramic inner ring 18 formed from a ceramic monolith member 20 attached to a fiber-reinforced member 22. Within the cavity formed by the inner and outer rings is positioned a ceramic ball rolling element 24 which is retained in position by a retainer 26. Normally a plurality of balls are used in a single assembly. The tolerances are designed so that the ceramic balls may freely rotate in the cavity. The ceramic monolith members and the ball 24 may be made of any suitable ceramic material as previously described herein, but preferably are silicon nitride. The fiber-reinforced members may also be made of any suitable materials as previously described herein. The retainer is preferably manufactured of heat-resistant ceramics, but may be manufactured of other suitable materials such as metal, metal alloys, and composites. The outer bearing ring generally has dimensions of about 4 to 500 mm and the ball 24 generally has a diameter of about ½ to 50 mm.

The rolling contact bearing is constructed by first forming the individual components, then attaching the fiber-reinforced members to the ceramic monolith members by means of a suitable active metal braze to form inner and outer bearing rings, and then assembling the complete bearing.

FIG. 2 (like parts have the same reference numerals) shows another rolling contact bearing assembly 28 which is similar to the bearing of FIG. 1, except that the geometry of the inner ring 30 is slightly different from the geometry of the inner ring 18 of the bearing of FIG. 1. In this embodiment the inner ring 30 comprises a ceramic monolith member 32 and a fiber reinforcement member 34.

An example of a roller style bearing is shown in FIG. 3. As shown, the bearing 35 comprises a ceramic outer ring 36 formed from a ceramic monolith member 38 attached to a fiber-reinforced member 40 and a ceramic inner ring 42 formed from a ceramic monolith member 44 attached to a fiber-reinforced member 46. In the cavity formed between the inner and outer rings is a cylindrical roller 48 positioned within the retainer 50. As in the previous designs, normally a plurality of rollers are present in a single assembly. The rings are free to rotate with respect to one another. The materials used to construct the individual members and the method of construction is as described with reference to FIG. 1.

In use, the ceramic composite bearing assemblies may be subjected to a variety of stresses from both steady applied loads and impact. In many cases the bearing races also serve as structural elements in the assembly which uses the bearing. While previous work has shown catastrophic failure of the rings to be unlikely from rolling fatigue sources, brittle failure is possible from impact, thermal excursions, and unexpected structural loads.

The fiber-reinforced ceramic reinforcing portions keep the monolithic race surfaces in rigid registration when a structural failure occurs in either the inner or outer ring. This interrupted failure will allow the bearing to function, albeit with increased vibration, until such time as the bearing can be replaced. The high wear resistance of the ceramic monolith will prevent rapid degradation of the fractured edges of the race surface. This invention eliminates catastrophic failure in these critical components, overcoming a severe impediment to the use of ceramic monolith, i.e. silicon nitride, bearings in commerce and industry.

In the following non-limiting examples all parts and percents are by weight unless otherwise specified.

EXAMPLE I

A 2×2×0.1 inch silicon nitride tile containing 1% magnesia sintering aid is prepared for joining by polishing to a 5.0 microinch rms finish with diamond paste. An identical sized tile of a calcium aluminosilicate ceramic glass reinforced with 35 volume % uniaxially aligned silicon carbide fiber (CAS/Nicalon Experimental #1 from Corning Glass Works) is prepared for joining by grinding the surface flat and also polishing to a 5.0 microinch rms finish. Both polished surfaces are cleaned of all dirt and oily residues. A 0.002 inch thick piece of active metal brazing foil having a composition of 23.5% copper, 60.75% silver, 1.25% titanium, and 14.5% indium (Incusil-ABA from GTE-WESCO) is placed between the two polished surfaces.

The tiles are fixed together to prevent sideways movement by placement in a graphite fixture which had been previously outgassed to 1200° C. in vacuum to reduce any absorbed gases. The fixture had been machined with a relief around the brazed area to prevent contact between the braze alloy and the graphite. A cold wall metallic element vacuum furnace which pulled an initial vacuum of greater than $10^{-5}$ Torr is used. The tiles are heated to 590° C. at 50° C. per minute, held for 20 minutes, heated to 770° C. at 15° C. per minute, held for 10 minutes, and then the furnace is cooled to room temperature.

The joined composite structure is cut into test specimens 0.231" wide×0.194" thick×2" long. The specimens are cut so that the fibers are parallel to the length of the specimen. The specimens are tested in a four point flexure configuration using a support span of 40 mm and a load span of 20 mm. The silicon nitride monoliths crack at an average stress of 69,300 psi with a strain at maximum stress of 0.0081. The cracked composite is shown in FIG. 4. As can be seen, the crack is through the monolith but stops at the braze which continues to hold the monolith in place. The fiber-reinforced ceramic body bonded to the monolith prevents catastrophic failure of the monolith. Deformation beyond the 0.0081 strain is within the fiber-reinforced ceramic material without catastrophic failure.

EXAMPLE II

The procedure of Example I is repeated except that the braze is replaced by a 0.004" thick active metal brazing foil having the composition 27.5% copper, 70.5% silver, and 2% titanium (Cusil from GTE/WESCO) and the high temperature brazing step is performed at 860° C. rather than 770° C.

The composite structure is tested in the same manner as Example I. The silicon nitride monoliths crack at an average stress of 67,250 psi with a strain at a maximum stress of 0.00765. The cracked composite is essentially identical as in FIG. 4 with the crack extending through the monolith but stopping at the braze which continues to hold the monolith in place. The fiber-reinforced ceramic body bonded to the monolith again prevents catastrophic failure of the monolith.

COMPARATIVE EXAMPLE A

The procedure of Example I is repeated except that the braze is omitted and direct bonding of the monolith to the fiber-reinforced ceramic body is attempted by hot pressing at temperatures of 1200°, 1400°, and 1500° C. for times ranging from 0.5 to 4 hours. The bodies do not join.

COMPARATIVE EXAMPLE B

The procedure of Comparative Example A is repeated except that an aluminosilicate glass is placed between the monolith and the fiber-reinforced ceramic body. A very weak join is formed, but the join does not survive machining into test specimens. Catastrophic failure of the monolith occurs during a stress-strain test.

COMPARATIVE EXAMPLE C

In an attempt to join silicon carbide fibers to a dense silicon nitride body, i.e. to use only the reinforcing fibers but without the ceramic body of Example I, by using nitrogen glasses, the following is done: a 2×2×⅛ inch tile of $Si_3N_4$ with 1% MgO was used as the monolith. SiC filaments (AVCO monofilaments) were cut and layered on the $Si_3N_4$ plate. On top of the fibers a powder mixture of a nitrogen glass forming composition (20 mole % AlN, 25 mole % $Y_2O_3$, 55 mole percent $SiO_2$) was applied. This was fired at 1520° C. for 2 hours in 1 atm of nitrogen. The result was brittle failure since the combination of filament plus glass did not form a composite structure having the necessary non-catastrophic failure characteristics.

COMPARATIVE EXAMPLE D

The same braze composition, braze conditions, and composite of Example III were used for joining to $Al_2O_3$ and $ZrO_2$ ceramic monoliths. The joinings were unsuccessful. Because of the larger coefficient of thermal expansion for $Al_2O_3$ and $ZrO_2$ than for silicon nitride and silicon carbide, they were put in tension during cooling, which caused the $Al_2O_3$ to crack and the braze to fail in the $ZrO_2$ case. The use of ductile metal interlayers along with the braze are necessary to join $Al_2O_3$ and $ZrO_2$ to the specific fiber-reinforced ceramic used.

What is claimed is:

1. A composite ceramic structure comprising a dense ceramic monolith bonded to a fiber-reinforced ceramic body having a fracture toughness of greater than about 20 $MPam^{\frac{1}{2}}$ by a high temperature resistant interlayer wherein the ceramic monolith does not fail catastrophically when placed in stress, and wherein the fiber in the fiber-reinforced ceramic body has a debonding layer disposed thereon.

2. The structure of claim 1, wherein the ceramic monolith is selected from the group consisting of silicon nitride and silicon carbide.

3. The structure of claim 1, wherein the ceramic monolith is silicon nitride.

4. The structure of claim 1, wherein the fiber-reinforced ceramic body is reinforced by fibers selected from the group consisting of alumina, carbon, silica, and silicon carbide fibers.

5. The structure of claim 4, wherein the fibers are continuous fibers.

6. The structure of claim 4, wherein the fibers are discontinuous fibers having a length of at least about 10 mm.

7. The structure of claim 1, wherein the fiber-reinforced ceramic body is reinforced by a silicon carbide fiber.

8. The structure of claim 1, wherein the fiber-reinforced ceramic body comprises a matrix selected from the group consisting of silicon nitride, silicon carbide, alumina, a silicate glass, and a silicate-based glass ceramic.

9. The structure of claim 1, wherein the fiber-reinforced ceramic body comprises a matrix selected from the group consisting of silicon nitride, silicon carbide, and a silicate-based glass ceramic.

10. The structure of claim 1, wherein the fiber-reinforced ceramic body comprises a matrix of a silicate-based glass ceramic.

11. The structure of claim 1, wherein the monolith is bonded to the body by an interlayer and a process selected from the group consisting of diffusion bonding with an active or reactive metal interlayer, reactive metal brazing, and active metal brazing.

12. The structure of claim 1, wherein the monolith is bonded to the body by an active metal braze.

13. The structure of claim 12, wherein the active metal braze comprises copper, silver, and titanium.

14. The structure of claim 12, wherein the active metal braze comprises an active metal selected from the group consisting of titanium, silver, copper, and indium.

15. A ceramic rolling contact bearing which does not fail catastrophically which comprises at least one dense ceramic monolith member bonded by a high temperature resistant layer to at least one fiber-reinforced ceramic member having a fracture toughness of greater than about 20 $MPam^{\frac{1}{2}}$ so as to form at least one composite member, and wherein the fiber in the fiber-reinforced ceramic has a debonding layer disposed thereon.

16. The bearing of claim 15, wherein the ceramic monolith member is silicon nitride.

17. The bearing of claim 16, wherein the fiber-reinforced ceramic member is a silicon carbide continuous fiber reinforced calcium aluminosilicate glass ceramic.

18. The bearing of claim 16, wherein the fiber-reinforced ceramic member is a silicon carbide discontinuous fiber-reinforced silicon nitride and the discontinuous fibers are at least about 10 mm long.

19. The bearing of claim 16, wherein the monolith member and the ceramic member are bonded by an active metal braze.

20. The bearing of claim 19, wherein the braze comprises copper, silver, and titanium.

21. The bearing of claim 15, wherein there are two composite members comprising an inner ring member and an outer ring member positioned so as to form a cavity therebetween for housing at least one rolling element.

22. The bearing of claim 21, additionally containing a ball rolling element.

23. The bearing of claim 22, wherein the ball rolling element is a ceramic body.

24. The bearing of claim 21, additionally containing a cylindrical rolling element.

25. The bearing of claim 24, wherein the cylindrical rolling element is a ceramic body.

* * * * *